July 1, 1952            S. J. EVERETT            2,601,744
FORMATION OF GLASS AND OTHER THERMOPLASTIC TUBES
Filed March 18, 1947            2 SHEETS—SHEET 1
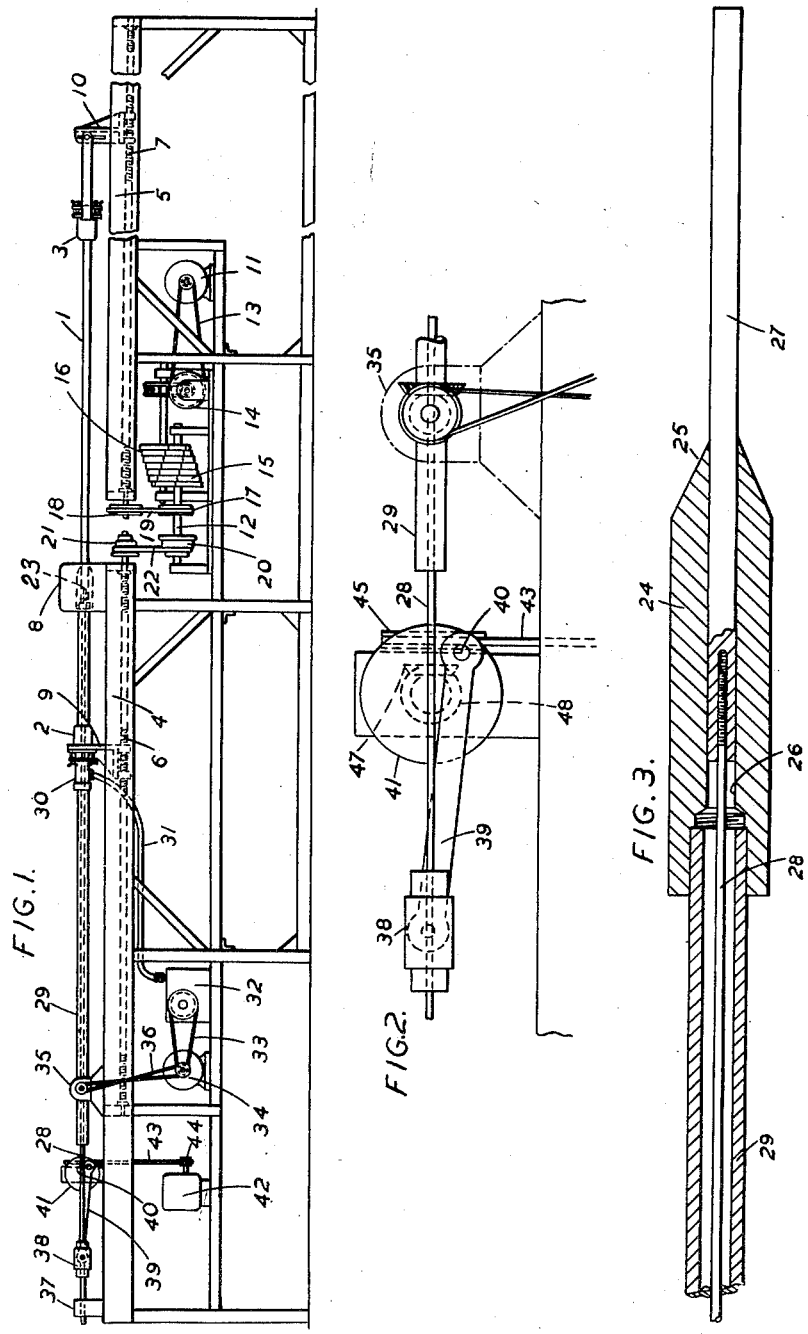
Inventor
SAMUEL JAMES EVERETT,
By
Attorney July 1, 1952　　　S. J. EVERETT　　　2,601,744
FORMATION OF GLASS AND OTHER THERMOPLASTIC TUBES
Filed March 18, 1947　　　2 SHEETS—SHEET 2
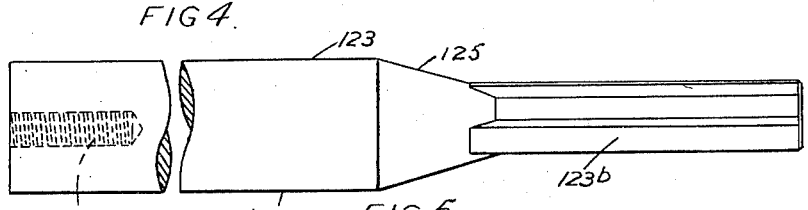
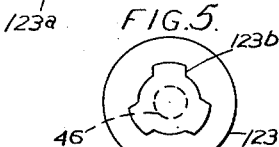
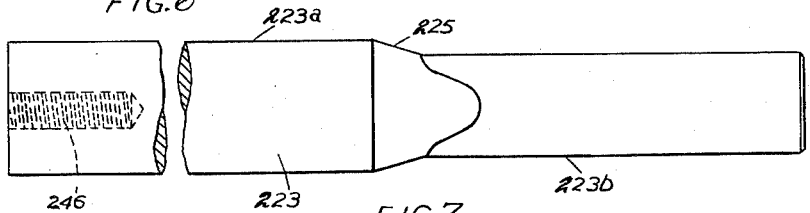
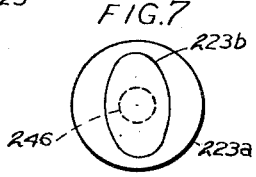
Inventor
SAMUEL JAMES EVERETT,
By
Robert B Larson
Attorney Patented July 1, 1952

2,601,744

UNITED STATES PATENT OFFICE 2,601,744

FORMATION OF GLASS AND OTHER THERMOPLASTIC TUBES

Samuel James Everett, Thornton Heath, England, assignor to James A. Jobling & Company, Ltd., Sunderland, England Application March 18, 1947, Serial No. 735,345
In Great Britain March 29, 1946

8 Claims. (Cl. 49—7)

1

This invention relates to the formation of glass or other thermoplastic tubes with a precision internal surface by stretching the tube while in the softened condition and thus drawing it on to a mandrel which, for that purpose, may be made of a diameter accurately true to size and with a surface finished absolutely true and smooth.

The object of the present invention, in the main, is to cope with certain drawbacks inherent in such stretching processes as hitherto known and the aim of the invention can be best expressed by a brief explanation of those difficulties. At present a length of tube has to be selected preferably with thick walls and the internal diameter not greatly exceeding the bore to which the tube is to be finished since otherwise, the tube when being brought down to the surface of the mandrel, crumples or is drawn so as to be finished with an uneven thickness at different points in a cross-section and at different points along its length. It follows therefore, that when a tube is to be finished with a very fine accurate bore as is needed for example for thermometer tubes, it has been necessary to start with a small tube. It can easily be appreciated that it is a consideration which has been in view for some time that the starting tubes should be of one size or at least have the smallest range of different diameters possible even although finished tubes may be required with an endless number of internal diameters. It is also clear that to meet that requirement the production of a finished tube with a very fine bore will involve a very large reduction in the internal diameter during the drawing process.

To meet these requirements, according to the invention, a mandrel which has a tapered section preferably connecting two parallel lengths of different diameters is utilized. The glass or other tubing employed can then be first applied to a length of the mandrel having a diameter only slightly less than the bore of the starting material and in practice of the order of one to two millimeters smaller in diameter. When the mandrel is to be rotated the driving rod would be secured to the larger end of the mandrel. The tapered portion has a gradual reduction in diameter until it attains a diameter corresponding to the bore of the tube to be produced. Clearly, also, such a mandrel can be employed in forming tubes which are of larger bore than the original stock.

The present invention also aims at providing a method of drawing such tubes which avoids the sticking of the tube to the mandrel and consequent breakages and yet enables the process to be carried out without rotating the mandrel and furthermore, reduces the liability of sticking to the mandrel even when the latter is rotated. This method can also be applied to processes of drawing glass or other thermoplastic tubes when employing a cylindrical mandrel without any taper.

This end is attained, according to the present invention, by rapidly reciprocating the mandrel with a small stroke during the drawing and shrinking of the tube on to the mandrel and it is found that the tubing stretches perfectly whether it is drawn down over a tapered mandrel or on to a parallel mandrel; these results can be obtained even when the mandrel is not rotated and the action is improved even when the mandrel is rotated. Good results have been obtained by reciprocating the mandrel for a distance of about $\frac{1}{32}$ to $\frac{3}{16}$ of an inch backwards and forwards and at a rate from 30–3000 strokes per minute.

It is possible to make tubes according to the invention which are not circular but approximate more or less to a similar form such as tubes which have a square, hexagon or other polygonal form from tubing having an internal bore but slightly larger than the largest internal dimension of the final form by having the mandrel shaped to the shape of the desired bore of the tube along the whole length of the mandrel on which the tube is stretched. This is not possible, however, for some sections of tubing; for example, in the case of a section which approximates to an ellipse with flat sides and rounded ends, the section being $\frac{5}{8}$ of an inch wide and $\frac{1}{16}$ across the narrow width in the bore. In such a case, according to the invention, the tubes may be made from thick-walled glass tubing of large diameter by using a mandrel of tapered form but not of constant cross-section. The large end, which the tubing used first approaches, is of circular cross-section and the taper is developed until it merges into a smaller parallel portion of the desired cross-section on which the final sizing and finishing of the drawn tube is effected.

In order that the invention may be clearly understood and readily carried into effect, arrangements in accordance therewith will now be described, by way of example, with reference to the accompanying drawings, in which:

Figure 1 is a side elevation of apparatus suitable for use in carrying the invention into effect;

Figure 2 is an enlarged view of the left-hand part of Figure 1;

Figure 3 is an elevation, partly in axial section, of a compound mandrel for use in the present invention; while Figures 4 and 6 are side elevations; and Figures 5 and 7 are end views from the right of the respective figures of two modified forms of the mandrel.

As described in British patent specification No. 547,880 (U. S. 2,393,979) the glass tube 1 being worked is supported between chucks 2, 3 which are constructed as described in that specification. They are traversed along guides 4, 5 by leadscrews 6, 7 to carry the tubing through the heating and softening zone constituted by a furnace 8 in which the tube is heated sufficiently to render it plastic. The chucks 2, 3 are carried on carriages 9, 10. The lead-screws 6, 7 are driven from an electric motor 11 which drives a countershaft 12 through a belt 13, a large-ratio worm reduction gearing 14, and reversely stepped pulleys 15, 16 enabling the speed of the countershaft 12 to be adjusted say, between 10 and 20 revolutions per minute. The countershaft 12 is connected to the lead-screw 7 through equal pulleys 17, 18 and a belt 19. The gearing ratio between the countershaft 12 and the lead-screw 6 is, however, variable by means of stepped pulleys 20, 21 and a belt 22. The chuck 2 is moved forwardly more slowly than the chuck 3 and the speed of the former can be adjusted to regulate the amount the glass tube 1 is stretched as it passes through the furnace 8.

The carriages 9, 10 carry split nuts which can be engaged with and disengaged from the leadscrews 6, 7 so that the chuck 2 can be moved to the left as viewed in Figure 1 and the chuck 3 moved close to the furnace 8 in readiness to begin the operation upon a length of glass cane. The glass tube as it is drawn through the furnace 8 becomes softened and is accordingly drawn on to the furnace of the mandrel 23 shown in greater detail in Figure 3.

The mandrel comprises a larger cylindrical length 24 which tapers down at its forward end as seen at 25 and is formed with a central bore 26 in which the smaller cylindrical length 27 of the mandrel can slide. The part 27 has screwed into its back end, a mandrel driving rod 28 and the larger part 24 has a mandrel driving tube 29 fixed in its back end.

The chuck 2 is constructed as described in the said prior specification except that the tube 30 sealed by a flexible tube at its rear end is somewhat larger to accommodate the mandrel driving tube 29. The evacuating side tube is seen at 31 and is connected to the vacuum pump 32 which is driven through a belt 33 by an electric motor 34 to reduce the pressure within the glass tube 1. The mandrel driving tube 29 passes back to gripping jaws in a support 35 in which the jaws are journalled and are driven from the motor 34 through a belt 36 and a worm reduction gearing in the support 35 so that the driving tube 29 and the larger part 24 of the mandrel are constantly rotated at relatively low speed.

The mandrel driving rod 28 extends backwards through the tube 29 to beyond the end of the latter and is supported in and can slide in a guide bearing 37. The rod 28 has a cross-head 38 fixed to it and the cross-head bears the gudgeon pin of a connecting rod 39 pivoted to a crank-pin 40 on a disc 41. The latter is rapidly rotated by an electric motor 42 through a belt 43 and pulleys 44, 45, the pulley 45 driving the crank-disc 41 through bevel gearing, 47, 48. The result is that the cross-head 38, the mandrel rod 28 and the inner part 27 of the mandrel are continuously rapidly reciprocated by an amount equal to twice the radius of the crank pin 40. The mandrel 23 projects a short distance out of the furnace 8 on its discharge side so as to give support to the tube 1 until it has cooled and hardened. The mandrel 23 is made of resistant material such as stainless steel which will withstand the temperature in the furnace 8.

The conditions as to temperature, the coating of the bore of the tube with lubricant and other precautions are taken care of as described in the said prior specification. As the tube 1 is drawn through the heating zone in the furnace 8, it is softened and stretched so as to sink on to the larger part 24 of the mandrel; it slides down the tapered portion 25 on to the smaller length 27 and is stretched or drawn on to that length and the weight per foot of the finished tube is regulated by adjusting the relative speeds of the chucks 2, 3.

Each of the forms of mandrel shown in Figures 4 to 7 consists of one piece tapped at the rear end at 46 in Figs. 4 and 5 and at 246 in Figs. 6 and 7 to receive a mandrel driving rod 28 by means of which the whole mandrel may be rapidly reciprocated. Each mandrel has a non-circular portion for determining the final form of the tubing, and therefore, the mandrel cannot be rotated. The mandrel driving tube 29 is therefore removed and a chuck 2 used with a smaller rear opening.

In Figures 4 and 5, the cylindrical part 123a tapers down at 125 and merges into the fluted section 123b, the drawing operation being effected as described with reference to Figures 1 to 3, except that the whole mandrel 123 is reciprocated and not rotated.

In Figures 6 and 7, the cylindrical part 223a tapers down at 225 and merges into the elliptical section 223b and the operation is the same as for Figures 4 and 5.

I claim:

1. An apparatus for forming a thermoplastic tube with an accurately finished bore comprising a mandrel having two parallel lengths of different diameters connected by a tapered portion, means for supporting said mandrel, feeding means for drawing a length of tubing over said mandrel to pass first over the mandrel length of larger diameter, then over said tapered mandrel portion and the mandrel length of smaller diameter, and a heating source for softening said tubing during passage thereof over said mandrel.

2. An apparatus for forming a thermoplastic tube with an accurately finished bore comprising a mandrel having two parallel lengths of different diameters connected by a tapered portion, means for supporting said mandrel, feeding means for drawing a length of tubing over said mandrel to pass first over the mandrel length of larger diameter, then over said tapered mandrel portion and the mandrel length of smaller diameter, a heating source for softening said tubing during passage thereof over said mandrel and means for rapidly reciprocating said mandrel length of smaller diameter relatively to said tubing in the direction of the axis thereof.

3. In the method of forming a tube with an accurately finished internal surface from thermoplastic material, the novel steps of drawing a length of tubing in softened condition on a first parallel length of mandrel, then over a tapered length of mandrel, and finally over a second parallel length of mandrel having smaller cross-sectional dimensions than said first length and thereby imparting the cross sectional form and dimensions of said second length to the interior of said tubing.

4. In the method of forming a tube with an accurately finished internal surface from thermoplastic material, the novel steps of drawing a length of tubing in softened condition on a first parallel length of mandrel of circular cross section, then over a tapered length of mandrel, and finally over a second parallel length of mandrel of circular cross section but of smaller diameter than said first length and thereby imparting the cross-sectional form and dimensions of said second length to the interior of said tubing, and continuously rotating said first length of mandrel during the drawing operation.

5. In the method of forming a tube with an accurately finished internal surface from thermoplastic material, the novel steps of drawing a length of tubing in softened condition on a first parallel length of mandrel, then over a tapered length of mandrel, and finally over a second parallel length of mandrel having smaller cross-sectional dimensions than said first length and thereby imparting the cross-sectional form and dimensions of said second length to the interior of said tubing, and rapidly reciprocating at least said second length of mandrel axially relatively to said tubing during the drawing operation.

6. In the method of forming a tube with an accurately finished internal surface from thermoplastic material, the novel steps of drawing a length of tubing in softened condition on a first parallel length of mandrel of circular cross section, then over a tapered length of mandrel, and finally over a second parallel length of mandrel of circular cross section but of smaller diameter than said first length and thereby imparting the cross-sectional form and dimensions of said second length to the interior of said tubing, continuously rotating said first length of mandrel during the drawing operation, and rapidly reciprocating said second mandrel length axially relatively to said tubing during the drawing operation.

7. An apparatus for forming a thermoplastic tube with an accurately finished bore, comprising a mandrel having two adjacent coaxial lengths of circular cross section and of different diameters, said length of larger diameter having a portion which tapers to the cross-sectional dimension of the other length, the length of larger diameter being mounted for rotation, feeding means for drawing a length of tube over said mandrel to pass first over the mandrel length of larger diameter, then over said tapered mandrel portion and the mandrel length of smaller diameter, a heating source for softening said tube during passage thereof over said mandrel, and means for continuously rotating that length of the mandrel having the larger diameter.

8. A method of reshaping a length of rigid tube of thermoplastic material to have an accurately dimensioned internal bore, which comprises progressively longitudinally softening a length of said rigid tube of thermoplastic material by heating, drawing said softened tube down to a reduced diameter by longitudinal stretching while causing said softened tube to conform to the surface of a supporting mandrel on both sides of, and at, the region where the reduction in cross section takes place.

SAMUEL JAMES EVERETT.

REFERENCES CITED

The following references are of record in the file of this patent:

UNITED STATES PATENTS

| Number | Name | Date |
|---|---|---|
| 2,393,979 | Everett | Feb. 5, 1946 |
| 2,396,635 | Bogoslowsky | Mar. 19, 1946 |
| 2,502,312 | Danner | Mar. 28, 1950 |

FOREIGN PATENTS

| Number | Country | Date |
|---|---|---|
| 339,503 | Germany | July 26, 1921 |